Figure 1:
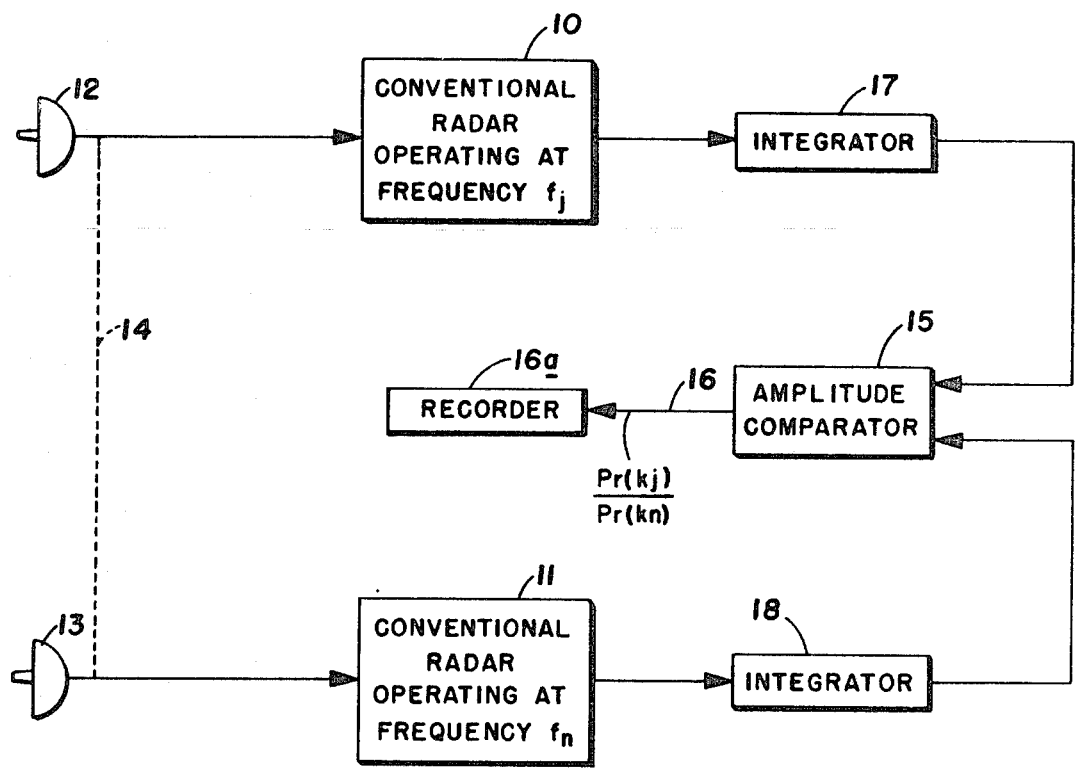

United States Patent [19]

Hicks

[11] 3,715,748
[45] Feb. 6, 1973

[54] METHOD AND APPARATUS FOR MEASURING THE INTENSITY OF ATMOSPHERIC TURBULENCE

[75] Inventor: John J. Hicks, Silver Spring, Md.

[73] Assignee: The United States of America as represented by the Secretary of the Navy

[22] Filed: April 30, 1971

[21] Appl. No.: 139,069

[52] U.S. Cl. .................................................343/5 W
[51] Int. Cl................................................G01s 9/00
[58] Field of Search ............................343/5 R, 5 W

[56] References Cited

UNITED STATES PATENTS 3,135,957   6/1964   Cunningham et al................343/5 W Primary Examiner—T. H. Tubbesing
Attorney—R. S. Sciascia, J. A. Cooke and R. J. Erickson

[57] ABSTRACT

A method and apparatus for measuring, with radar, the intensity of atmospheric turbulence and/or distinguishing between the radar reflections from clear air turbulence and those produced either by clouds or by the occurrence of a large vertical gradient in radar refractivity. Two or more conventional microwave radars operated simultaneously at different preselected frequencies, transmit and receive reflected energy from a selected atmospheric volume. The received signals are processed to obtain a comparison of the signal amplitudes or intensities from the radars and the data derived from this comparison is utilized to indicate the intensity of detected clear air turbulence and to distinguish such turbulence from other atmospheric phenomena; e.g., clouds, etc. which also produce radar reflections.

4 Claims, 2 Drawing Figures

JOHN J. HICKS
INVENTOR.

METHOD AND APPARATUS FOR MEASURING THE INTENSITY OF ATMOSPHERIC TURBULENCE

BACKGROUND OF THE INVENTION

Much research and development effort is currently being expended, both by the United States Government and by private industry, to produce a reliable system for performing remote detection and warning of clear air turbulence, abbreviated CAT. However, so far as is known, no completely reliable system of this type has as yet been produced, even though considerable progress has been made and especially in the area of utilizing radar as the remote detector. For example, one radar system for detecting clear air turbulence is described in U.S. Letters Pat. No. 3,491,358 which issued to me on Jan. 20, 1970. In this patented system, conventional pulsed doppler radar of proper PRF is utilized and the radar signal output at a particular range or set of ranges is processed successively by coherent and non-coherent integrators to yield information concerning the existence and thickness of clear air turbulence present in the atmospheric volume being monitored.

On the other hand, the intensity of a radar echo or reflection from clear air turbulence and the intensity or severity of such clear air turbulence are not uniquely related. In other words, even though a radar echo may imply the presence of clear air turbulence, it does not afford any measure of the severity of such turbulence. In addition, so far as is known, the prior art is devoid of any radar systems capable of distinguishing the echoes or reflections produced by clear air turbulence from those produced by clouds and/or by a relatively large vertical gradient in radar signal refractivity within the atmospheric volume being sampled by the radar.

In view of the foregoing discussion, one object of the present invention is to provide a radar system for detecting and indicating the intensity or severity of clear air turbulence.

A further object of the present invention is to provide a radar system capable of distinguishing clear air turbulence from clouds and/or relatively large vertical gradient in radar signal refractivity within the atmospheric volume being sampled.

A further object of the present invention is to provide a system employing radar and based on the theory of homogeneous isotropic turbulence for detecting and indicating the severity of clear air turbulence and for distinguishing the radar returns produced by such turbulence from those caused by either clouds or a relatively large vertical gradient of radar signal refractivity.

Figure 2:
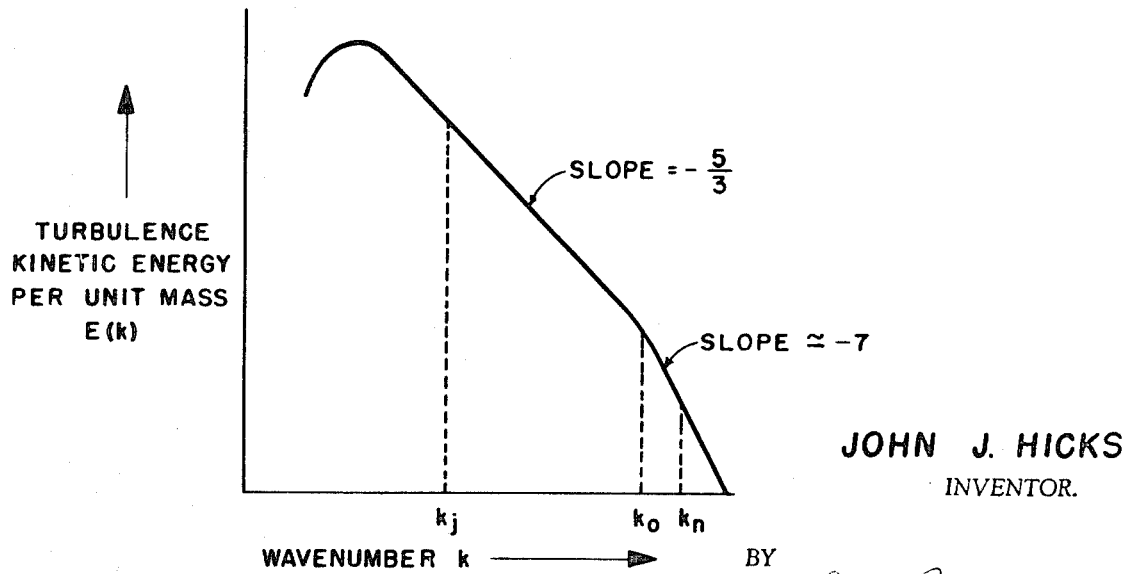

Other objects, purposes and characteristic features of the present invention will in part be pointed out as the description of the present invention progresses and in part be obvious from the accompanying drawings wherein:

FIG. 1 is a block diagrammatic view of the proposed clear air turbulence detection system according to the present invention; and FIG. 2 is a graph illustrating how the so-called turbulence kinetic energy per unit mass, $E(k)$, for the atmosphere varies as a function of wavenumber $k$.

As previously mentioned, it is proposed in accordance with the present invention to utilize radar for not only detecting but also for measuring or determining the intensity or severity of clear air turbulence. Moreover, the proposed radar system will distinguish the radar echoes produced by such turbulence from the radar echoes caused by either clouds or a relatively large vertical gradient in radar signal refractivity.

Referring now to FIG. 1 of the drawings, it is proposed in accordance with the present invention to utilize a plurality of conventional radar transmitting-receiving units such as designated at 10 and 11. These units can be conventional microwave radars and do not have to be the doppler type units called for in my prior clear air turbulence system disclosed in U.S. Pat. No. 3,491,358. As shown in FIG. 1, the radar units 10 and 11 may either have their own antennas 12 and 13 respectively or they may share the same antenna, as indicated by the dashed line 14.

In any event, the radar units 10 and 11 operate simultaneously at different assigned frequencies, designated in FIG. 1 as frequency $f_j$ for radar unit 10 and frequency $f_n$ for radar unit 11, to sample simultaneously the same atmospheric volume in which the detection and measurement of clear air turbulence is desired.

The respective signal outputs from the radar units 10 and 11 are designated, in FIG. 1, by the terms $P_r(k_j)$ and $P_r(k_n)$ respectively and represent the reflected signal energy or power received at each of these radar units, at the associated frequency (wavenumber). These two radar output quantities are applied to a suitable amplitude comparator 15, of conventional design, which produces an output signal on line 16 representing the ratio of these two received power quantities $(P_r(k_j))/(P_r(k_n))$. As shown in FIG. 1, this ratio signal is then applied to suitable recording apparatus 16a which can be of any suitable type such as, for example, a properly calibrated voltmeter, video tape recorder, etc. If desired, other pertinent data such as radar antenna position, radar range and the like can also be recorded in a number of ways well-known to those skilled in the art. In FIG. 1, it will also be noted that suitable integrators 17 and 18 may, if desired, be interposed between the output of the radar units 10 and 11 and the amplitude comparator 15 for the purpose of increasing the signal-to-noise ratio at the radar outputs. Obviously, the system illustrated in FIG. 1 may be mounted in either an aircraft or on the ground depending upon the requirements of practice.

The theory of homogeneous isotropic turbulence and the implications that it has to the scatter of microwave energy are well-known and have been discussed, for example, by V. I. Tatarski in Wave Propagation in a Turbulent Medium, McGraw Hill Book Co., Inc., (1961). Briefly, this theory states that the turbulence kinetic energy per unit mass, $E(k)$, is distributed in wavenumber, $k$, according to the relationship $E(k) = \alpha \epsilon$ two-thirds $k$ −five-thirds within the so-called inertial subrange $K_o \ll k \ll k_o$, where $\alpha$ is a constant, $\epsilon$ is the dissipation rate of kinetic energy per unit mass and $k$ is wavenumber. It is also well-known that the spectrum of refractivity fluctuations intensity follows this same general law and we need not distinguish between these for present purposes.

The above-noted theory also states that for $k > k_o$, the kinetic energy is dissipated rapidly into heat by molecular action which results in a more rapid fall-off of the quantity $E(k)$ with increasing wavenumber $k$.

Even though the shape of the curve, E(k) vs. k, in this so-called dissipation range ($k > k_o$) is not known exactly, it is established that the relationship $E(k) \sim k^{-7}$, for $k > k_o$, gives a fairly accurate description of the behavior of the kinetic energy variation in the dissipation range. In any event, the exact form of the spectrum in this dissipation range is not crucial but what is significant is that it is of rapidly descending form, when compared with the form of the spectrum within the inertial range. Also of significance is the fact that the greater the turbulence intensity, the smaller the size of the limiting microscale, $l_o = 4\pi/k_o$, or the larger the limiting or cut-off wavenumber, $k_o$. Another consequence of the theory to be recognized here is that the wavenumber at which clear air turbulence detection is made by the monostatic radar is $k = 4\pi/\lambda$, where $\lambda$ is the radar wavelength, while cloud particle detection is efficient at the smaller wavelengths where particle diameter $D \leq 0.2\lambda$. Typical radar wavelengths for the radar units 10 and 11 could, for example, be on the order of $\lambda_n \cong 1$ to 3 cm. or so and $\lambda_j \cong 5$ to 100 cm. or so.

Referring now to FIG. 2, this drawing illustrates a curve of E(k) as a function of wavenumber and represents the kinetic energy spectrum within the inertial and dissipation ranges on log-log coordinates. With the radar 11 operated at a frequency corresponding to wavenumber $k_n$ while radar unit 10 is operated at a frequency corresponding to $k_j$, it is seen that if $k_o$ increases due to increased turbulence kinetic energy (clear air turbulence present) such that $k_n < k_o$, then the energy about $k_n$ increases at a greater rate than the energy about $k_j$. Accordingly, with $k_n$ selected to have a value just above $k_o$, as shown in FIG. 2, the presence of clear air turbulence would cause the ratio of power received at the radar units 10 and 11; i.e., as indicated by the signal $P_r(k_j)/P_r(k_n)$ on line 16 in FIG. 1, to decrease to a limiting value dictated by the —five-thirds law. The recorded value of the signal quantity $P_r(k_j)/P_r(k_n)$ thus provides, to an operator for example, an indication of when clear air turbulence is present and might also be utilized to actuate a visual or audio alarm, if desired.

On the other hand, if the radar units 10 and 11 detect cloud particles, the ratio of the received powers and the signal quantity $P_r(k_j)/P_r(k_n)$ is somewhere between the value dictated by the —five-thirds law discussed above and the value dictated by the well-known $\lambda^{-4}$ dependence. The exact value of the signal quantity $P_r(k_j)/P_r(k_n)$ in the presence of clouds is unimportant for the purposes of this discussion, suffice it to say that such value is different from the value of this quantity when clear air turbulence occurs; i.e., dictated by the —5/3 law, and the signal quantity $P_r(k_j)/P_r(k_n)$ therefore enables the operator (or an alarm circuit) to distinguish between clouds and clear air turbulence. It is also theoretically possible to determine the individual contributions, to the radar reflections, of clouds and clear air turbulence when they exist in the same atmospheric region and the signal quantity $P_r(k_j)/P_r(k_n)$ reveals this also.

As mentioned earlier, increased radar echo received at radar unit 10 corresponding to wavenumber $k_j$ may be due to a relatively large vertical gradient in radar signal refractivity rather than more intense clear air turbulence. In this case, $k_o$ does not increase (and may actually decrease since the higher frequencies are damped first at stable regions where clear air turbulence is preferentially located) and hence the power ratio and the signal $P_r(k_j)/P_r(k_n)$ appearing on line 16 increase in value. Accordingly, by merely noting whether the recorded value of this power ratio signal has increased or decreased, the operator is able to distinguish the radar echoes produced by clear air turbulence from those produced by a large vertical gradient in refractivity.

In summary, the proposed radar system of the present invention comprises two or more radar units operating simultaneously on different preselected frequencies to sample the same atmospheric volume. The radar echo powers received at the respective radar units are compared and a signal representing the ratio of these powers is produced which: decreases in the presence of clear air turbulence with increasing echo and increasing clear air turbulence intensity; it decreases when clouds are detected but at such an exaggerated rate that no confusion with clear air turbulence is possible if wavenumber $k_j$ is only a few times less than $k_n$, which is desirable for clear air turbulence detection also; it decreases with increasing echo at some intermediate rate if both clear air turbulence and clouds are present; and, it increases only when the mean vertical gradient of potential refractivity is more effective, relative to the clear air turbulence intensity, in producing the radar echo. Accordingly, the operator need only examine the relationship between the quantities $P_r(k_j)$ and $P_r(k_n)$ to determine the clear air turbulence intensity, or cloud echo intensity, if present.

As mentioned previously, the proposed clear air turbulence detection/identification radar system of the present invention is not restricted to application aboard an aircraft but may as well be utilized as a ground-based system. For example, the proposed clear air turbulence detection system could be located near a missile launch area to provide a basis for determining whether clear air turbulence is sufficiently strong to affect the control of a missile and perhaps also provide the measure of knowledge required to make a decision on what launch area, if any, should be employed.

Other modifications, adaptations and alterations to the present invention are of course possible in light of the above teachings. It should therefore be understood at this time that within the scope of the appended claims, the invention may be practiced otherwise than as specifically described.

What is claimed is:

1. An atmospheric turbulence detection system comprising, in combination,
   a plurality of microwave radar means operating simultaneously at different associated and predetermined frequencies for transmitting microwave energy towards and receiving reflected energy from a selected atmospheric volume,
   the operating frequencies of said plurality of radar means encompassing a known radar frequency at which atmospheric turbulence is detectable by radar,
   each of said radar means producing a signal output corresponding to the amount of reflected energy received by that particular radar means, signal processing means operably connected to each of said radar means for processing the signal outputs from said plurality of radar means to obtain a comparison of the reflected energy received by, and recording means operably connected to said signal processing means for producing a registration indicating the results of the comparison performed by said signal processing means.

2. The atmospheric turbulence detection system specified in claim 1 further including integrator means operably connecting each radar means to said signal processing means for increasing the signal to noise ratio of the signal output from each of said radar means.

3. The atmospheric turbulence detection system specified in claim 1 wherein the radar energy reflected from said selected atmospheric volume when occupied by clear air turbulence varies substantially as a linear function of wavenumber at a first known slope below a predetermined limiting wavenumber and at a second known slope of greater magnitude than said first slope for wavenumbers greater than said limiting wavenumber, wherein a first one of said radar means is operated at a frequency corresponding to a wavenumber greater than said limiting wavenumber and a second one of said radar means is operated at a frequency corresponding to a wavenumber less than said limiting wavenumber, and wherein said signal processing means includes amplitude comparator means responsive to the signal output produced by each of said radar means for producing a signal output representing the ratio of the reflected radar powers which are received by said first and second radar means.

4. The atmospheric turbulence detection system specified in claim 3 wherein said recording means is operably connected to receive and respond to said ratio signal output from said amplitude comparator means for providing a registration of the value of said ratio signal output from said amplitude comparator means relative to predeterminable values of said ratio signal output known to represent respectively the presence and intensity of clear air turbulence, the presence of clouds, and the presence of a large vertical gradient in radar signal refractivity, in said selected atmospheric volume.

* * * * *